United States Patent
Shafie et al.

(10) Patent No.: US 12,476,337 B2
(45) Date of Patent: Nov. 18, 2025

(54) BUS BAR HOLDER INCLUDING A LEAD-IN STRUCTURE, ELECTRICAL CONDUCTION ASSEMBLY HAVING A BUS BAR, AND BATTERY INCLUDING THE SAME

(71) Applicant: CPS Technology Holdings LLC, New York, NY (US)

(72) Inventors: Abed Al Fattah Isam Shafie, Shorewood, WI (US); Nicholas E. Elison, Mequon, WI (US); Christopher M. Bonin, South Milwaukee, WI (US); Jason D. Fuhr, Sussex, WI (US); Ken Nakayama, Racine, WI (US); Xugang Zhang, Burlington, WA (US); Judson W. Riggins, Milwaukee, WI (US)

(73) Assignee: CPS Technology Holdings LLC, New York, NY (US)

( * ) Notice: Subject to any disclaimer, the term of this patent is extended or adjusted under 35 U.S.C. 154(b) by 971 days.

(21) Appl. No.: 17/500,717

(22) Filed: Oct. 13, 2021

(65) Prior Publication Data

US 2022/0085460 A1  Mar. 17, 2022

Related U.S. Application Data

(62) Division of application No. 17/598,440, filed as application No. PCT/US2020/025329 on Mar. 27, 2020.
(Continued)

(51) Int. Cl.
*H01M 50/583* (2021.01)
*H01M 10/42* (2006.01)
(Continued)

(52) U.S. Cl.
CPC ....... *H01M 50/583* (2021.01); *H01M 10/425* (2013.01); *H01M 50/505* (2021.01);
(Continued)

(58) Field of Classification Search
CPC .......... H01M 10/0525; H01M 10/425; H01M 50/505–583; H01M 50/204–284;
(Continued)

(56) References Cited

U.S. PATENT DOCUMENTS

2007/0087266 A1  4/2007 Bourke et al.
2011/0076521 A1  3/2011 Shimizu et al.
(Continued)

FOREIGN PATENT DOCUMENTS

CN  203968491 U  11/2014
CN  104821385 A  8/2015
(Continued)

OTHER PUBLICATIONS

International Search Report and Written Opinion of the International Search Authority dated Aug. 21, 2020 for International Application No. PCT/US2020/025329 filed Mar. 27, 2020, 19 pages.
(Continued)

*Primary Examiner* — Jonathan G Leong
*Assistant Examiner* — Kan Luo
(74) *Attorney, Agent, or Firm* — Boardman & Clark LLP

(57) ABSTRACT

An electrical conduction assembly comprising a flexible layer, an interface being associated with and electrically coupled to a terminal of an external electrical element, and a circuit trace coupled to the flexible layer and to the interface. The circuit trace includes a fuse as part of the trace, and the fuse is associated with the interface. Also disclosed is a battery including the electrical conduction assembly. Further disclosed is a bus bar holder for a battery.
(Continued)

The bus bar holder includes a lead-in structure coupled with a main body on a first side. The lead in structure includes a first lead-in wall to be disposed between a first plurality of battery cells and a second lead-in wall orthogonal to the first lead-in wall. The bus bar holder can also include a plurality of pockets, each or which includes a respective aperture and a respective recess.

14 Claims, 13 Drawing Sheets

Related U.S. Application Data

(60) Provisional application No. 62/838,749, filed on Apr. 25, 2019, provisional application No. 62/825,590, filed on Mar. 28, 2019.

(51) Int. Cl.
*H01M 50/505* (2021.01)
*H01M 50/507* (2021.01)
*H01M 50/516* (2021.01)
*H01M 50/519* (2021.01)
*H05K 1/02* (2006.01)

(52) U.S. Cl.
CPC ....... *H01M 50/507* (2021.01); *H01M 50/516* (2021.01); *H05K 1/028* (2013.01); *H05K 1/0296* (2013.01); *H01M 2010/4271* (2013.01); *H01M 50/519* (2021.01); *H01M 2220/20* (2013.01); *H05K 2201/10037* (2013.01); *H05K 2201/10181* (2013.01)

(58) Field of Classification Search
CPC ..... H01M 2010/4271; H01M 2200/20; H01M 2200/103; H01M 50/583; H01M 50/516; H01M 50/507; H01M 50/519; H01M 2220/20; H05K 2201/09263–10272; H05K 1/028; H05K 1/0296; H05K 2201/10037; H05K 2201/10181
See application file for complete search history.

(56) References Cited

U.S. PATENT DOCUMENTS

| | | | |
|---|---|---|---|
| 2013/0101869 | A1 | 4/2013 | Farmer |
| 2013/0202941 | A1 | 8/2013 | Ono et al. |
| 2016/0093864 | A1 | 3/2016 | Nakamura et al. |
| 2016/0365562 | A1 | 12/2016 | Sugiyama |
| 2017/0084962 | A1 | 3/2017 | Siu et al. |
| 2018/0009195 | A1 | 1/2018 | Takeuchi et al. |
| 2018/0198110 | A1 | 7/2018 | Zeng |
| 2018/0229621 | A1* | 8/2018 | Roh et al. ............... B60L 11/18 |
| 2019/0044119 | A1* | 2/2019 | Fernandez-Galindo et al. ............ H01M 2/20 |
| 2020/0044227 | A1* | 2/2020 | Ryu et al. ............... H01M 2/26 |

FOREIGN PATENT DOCUMENTS

| | | |
|---|---|---|
| CN | 105518903 A | 4/2016 |
| CN | 106133948 A | 11/2016 |
| CN | 205882042 U | 1/2017 |
| CN | 205900680 U | 1/2017 |
| CN | 206611639 U | 11/2017 |
| CN | 107732607 A | 2/2018 |
| CN | 107925032 A | 4/2018 |
| CN | 207947332 U | 10/2018 |
| CN | 108987660 A | 12/2018 |
| CN | 109390536 A | 2/2019 |
| EP | 2791997 A1 | 6/2016 |
| JP | 2002184281 A | 6/2002 |
| KR | 20100135601 A | 12/2010 |
| KR | 20170056877 A | 5/2017 |
| KR | 20180022480 A | 3/2018 |
| WO | 2005086196 A1 | 9/2005 |
| WO | 2018087682 A1 | 5/2018 |
| WO | 2018221004 A1 | 12/2018 |
| WO | 2020/198624 A1 | 10/2020 |

OTHER PUBLICATIONS

International Preliminary Report on Patentability dated Sep. 28, 2021 for International Application No. PCT/US2020/025329 filed Mar. 27, 2020, 11 pages.
Extended European Search Report dated Nov. 5, 2024, received in connection with European Application No. 23210862.1.

\* cited by examiner

BUS BAR HOLDER INCLUDING A LEAD-IN STRUCTURE, ELECTRICAL CONDUCTION ASSEMBLY HAVING A BUS BAR, AND BATTERY INCLUDING THE SAME

RELATED APPLICATIONS

This application is a division application of U.S. patent application Ser. No. 17/598,440 entitled "FLEXIBLE CIRCUIT HAVING A FUSE, BUS BAR HOLDER INCLUDING A LEAD-IN STRUCTURE, ELECTRICAL CONDUCTION ASSEMBLY HAVING A BUS BAR, AND BATTERY INCLUDING THE SAME," which has a filing date of Sep. 27, 2021, and which is a national phase filing of International Patent Application No. PCT/US2020/025329 entitled "FLEXIBLE CIRCUIT HAVING A FUSE, BUS BAR HOLDER INCLUDING A LEAD-IN STRUCTURE, ELECTRICAL CONDUCTION ASSEMBLY HAVING A BUS BAR, AND BATTERY INCLUDING THE SAME," which has an international filing date of Mar. 27, 2020, and claims the benefit of U.S. Patent Application No. 62/838,749 filed on Apr. 25, 2019 entitled "EMBEDDED FUSE DESIGN IN LITHIUM ION VOLTAGE AND TEMPERATURE SENSING COMPONENT;" and also claims the benefit of U.S. Patent Application No. 62/825,590 filed on Mar. 28, 2019 entitled "EMBEDDED FUSE DESIGN IN LITHIUM ION VOLTAGE AND TEMPERATURE SENSING COMPONENT;" the entire contents of each of which are hereby incorporated by reference herein for all purposes.

BACKGROUND

This disclosure relates to the field of batteries. Aspects of the disclosure relate to the field of battery safety for batteries. Aspects of the disclosure relate to bus bar holders for batteries.

Generally, a battery system may include one or more batteries that store electrical energy. Thus, battery systems are often implemented in electrical systems. In particular, using stored electrical energy, a battery may supply electrical power to an electrical load in the electrical system, thereby discharging the battery. Additionally, the battery may capture electrical power from an electrical source (e.g., a generator) in the electrical system, thereby storing it as electrical energy and charging the battery.

In advanced batteries, for example but not limited to, lithium ion batteries, a battery control module (BCM), which may also be referred to as a battery management unit (BMU), may be provided to regulate battery function of the battery, which may also be referred to as a battery module. The BCM or BMU (collectively referred to hereinafter as the BCM) may comprise one or more printed circuit boards (PCBs) which may include a processor and memory programmed to monitor and control the battery. The BCM may perform load balancing and control charging and discharging of the battery.

Known PCBs for BCMs may be prone to internal and external short circuits. Further, the BCMs may be insufficient to protect the battery management system and battery from undesirable currents from the cells. An improved BCM with an improved PCB is desired.

In traditional configurations, advanced batteries may include electrochemical cells disposed in a housing through an opening in the housing. Traditional configurations may also include a holder or carrier disposed over the electrochemical cells and within the opening of the housing. It is now recognized that it is desirable to facilitate placing and maintaining the carrier in the opening of the housing and over the electrochemical cells for quickly and readily electrically connecting a PCB to the electrochemical cells.

SUMMARY

Disclosed herein is an apparatus which may address one or more deficiencies known above. In one or more constructions, the apparatus may aid in the interruption of high currents generated from short circuits in or through a flexible circuit. Alternatively or additionally in one or more constructions, the apparatus may quickly and readily place an electrical conduction assembly next to a plurality of battery cells for easing electrical connection. Also or additionally in one or more implementations, a method of assembling a battery module may help address one or more deficiencies known above.

In one embodiment, disclosed is a flexible circuit, which can be used with a battery control module (BCM). The flexible circuit may comprise embedded traces which may connect battery cells to the BCM. The traces may further comprise one or more fusable links, which may also be referred to herein as fuses. The flexible circuit may further comprise a coating such as but not limited to one or more layers of polyimide.

In another embodiment, disclosed is an electrical conduction assembly, which can have a flexible circuit. The flexible circuit comprises a flexible layer, an interface being associate with and electrically coupled to a terminal of an external electrical element, and a circuit trace coupled to the flexible layer and to the interface. The circuit trace includes a fuse as part of the trace, and the fuse is associated with the interface. Consequently, the fuse is further associated with the external electrical element.

The electrical conduction assembly can be used in a battery (or battery module). The battery may include a housing, a plurality of battery cells housed by the housing, and the electrical conduction assembly housed by the housing and electrically coupled to the plurality of battery cells. The plurality of battery cells can include a battery cell having a cell terminal, and the interface of the electrical conduction assembly may be a cell interface associated with and electrically coupled to the cell terminal.

The disclosed apparatus may have a number of advantages regarding safety and consistency, for example but not limited to in the automotive environment. The advantages may be realized by features including fuse shape, fuse location within the trace and with reference to the bus bars, the coating layers and material type, event encapsulation, fusing time consistency, and use of embedded fuses.

In a further embodiment, disclosed is a bus bar holder (or carrier) comprising a main body and a lead-in structure coupled with the main body. The main body includes a first side to be disposed next to a first plurality of battery cells and a second plurality of battery cells, and a second side opposite the first side and to be disposed away from the first plurality of battery cells and the second plurality of battery cells. The lead-in structure includes a first lead-in wall to be disposed between the first plurality of battery cells and the second plurality of battery cells, and a second lead-in wall orthogonal to the first lead-in wall. The second lead-in wall is to be disposed between a wall of a battery housing, and the first plurality of battery cells and the second plurality of battery cells. The lead-in structure can facilitate placing and maintaining the holder with respect to the battery housing and the plurality of battery cells.

In a yet further embodiment, disclosed is an electrical conduction assembly for a battery. The electrical conduction assembly can include a bus bar holder, a plurality of bus bars held by the bus bar holder, and an electrical circuit is coupled to the plurality of bus bars. The bus bar holder has a first plurality of apertures, a first side to be disposed next to the plurality of battery cells, and a second side opposite the first side and to be disposed away from the plurality of battery cells. The second side comprises a plurality of pockets, each pocket of the plurality of pockets including at least one of the first plurality of apertures and a recess. Each bus bar of the plurality of bus bars is disposed in a respective pocket of the plurality of pockets. Each bus bar of the plurality of bus bars has a tab disposed in the recess of the respective pocket. The tab can be a placement tab and/or an interface tab. The receptables and tabs can facilitate properly and quickly connecting the plurality of bus bars to the electrochemical cells.

These and other features and advantages of devices, systems, and methods according to this invention are described in, or are apparent from, the following detailed descriptions of various examples of embodiments.

BRIEF DESCRIPTION OF THE DRAWINGS

One or more examples of embodiments of the apparatus and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DESCRIPTION

Figure 1:
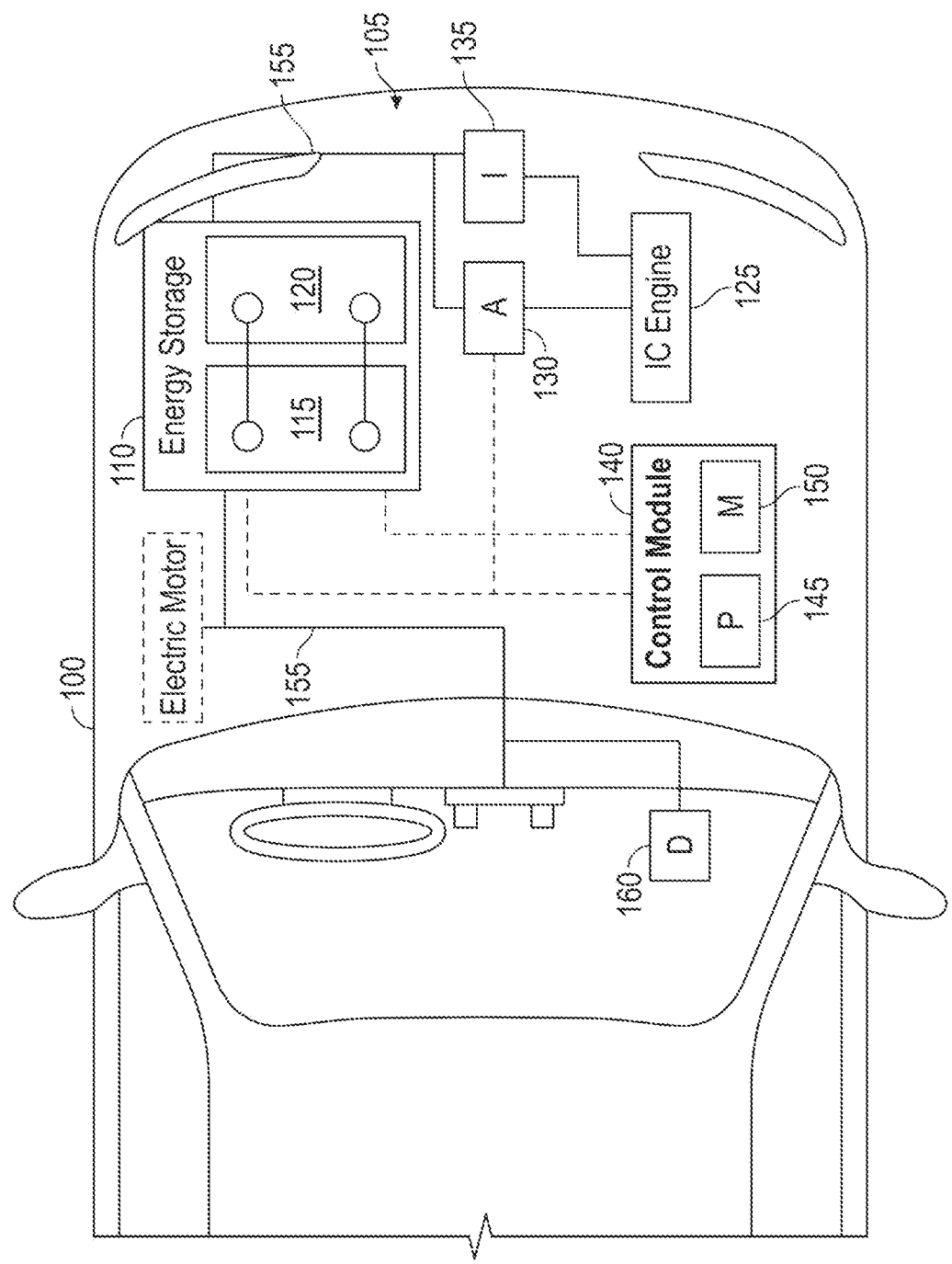
FIG. 1 is a cut-away block diagram of a vehicle showing portions of an electrical system.

The disclosure may be understood to relate to (but not be limited to) use of a battery in a vehicle environment. In various embodiments, the battery may be a lithium ion or other advanced battery. FIG. 1 shows a cut-away of a vehicle 100 having an electrical system 105 for electrical infrastructure in the vehicle 100. The electrical system 105 may include an energy storage component 110 which may comprise one or more battery modules 115/120. The vehicle 100 may further comprise an engine 125, alternator 130, ignition system 135, and control module 140 which may have a processor 145 and memory 150. The energy storage component 110 may electrically couple to the vehicle's electrical system 105 by way of a bus 155. This may allow for powering of vehicle functionality including electrical devices such as the vehicle display 160 and advanced vehicle functionality.

A vehicle electrical system 105 may be included in an automotive vehicle or the like. In some embodiments, the control module 140 may control operation of the electrical system 105 and/or the electrical devices. For example, in an automotive vehicle, the control module 140 may include a battery management system (BMS) and/or a vehicle control unit (VCU).

Figure 2:
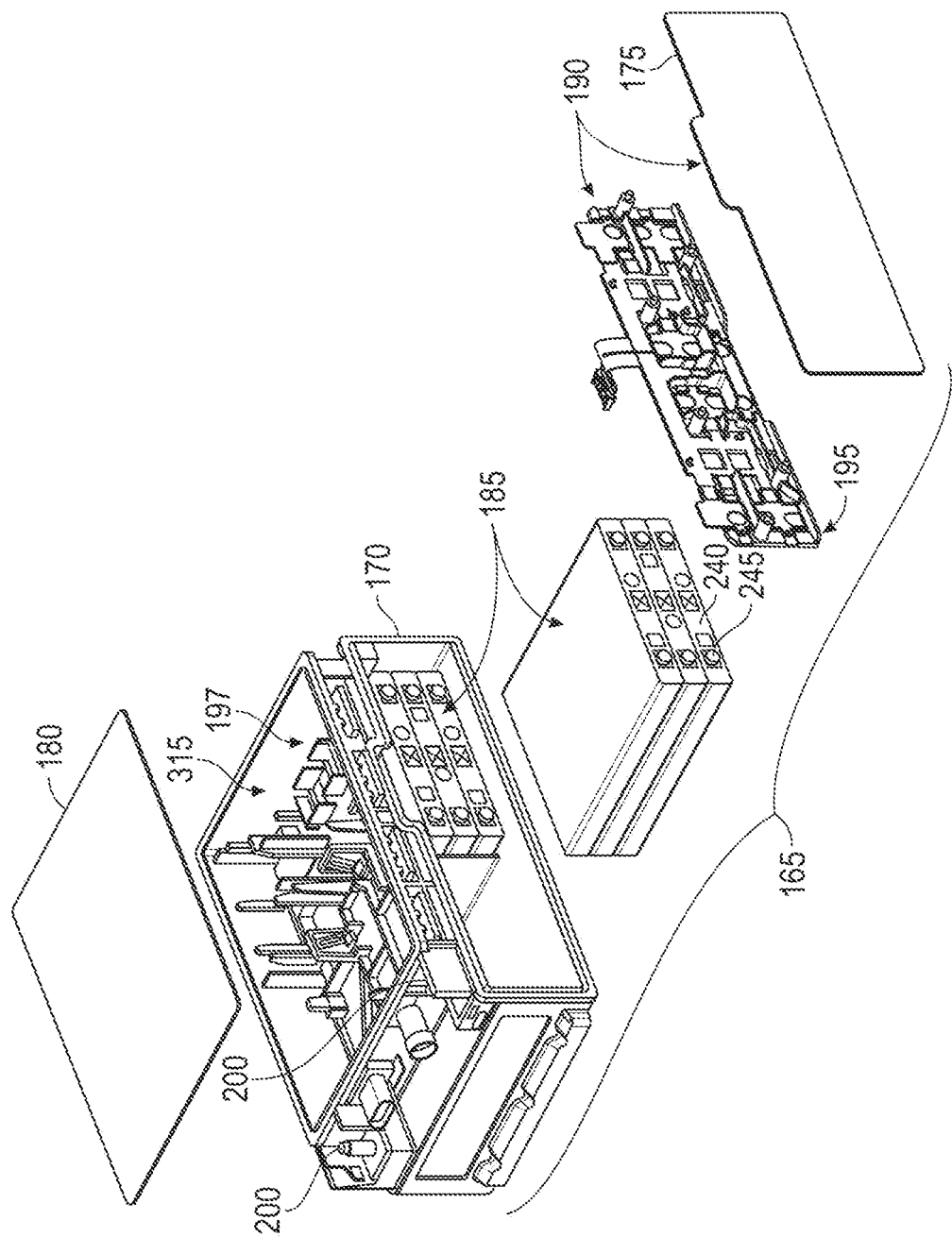
FIG. 2 is an exploded view of a battery (or battery module) capable of being used in the vehicle of FIG. 1.

FIG. 2 shows an example battery (or battery module) 165 for understanding the apparatus and process herein, according to various embodiments. In FIG. 2, an exploded view of portions of the battery 165 is shown. The battery 165 is seen to comprise a housing 170 which may likewise comprise a number of covers 175 and 180. Cells 185 may be provided in the housing 170, which may be connected for use with a lid assembly 190. An electrical conduction assembly (or printed circuit board (PCB) assembly) 195 may likewise be provided. The electrical conduction assembly 195 can couple to the battery control module (BCM) 197 and may be considered part of the BCM 197. One or more terminals 200 may be provided to allow for access to battery power.

Figure 3:
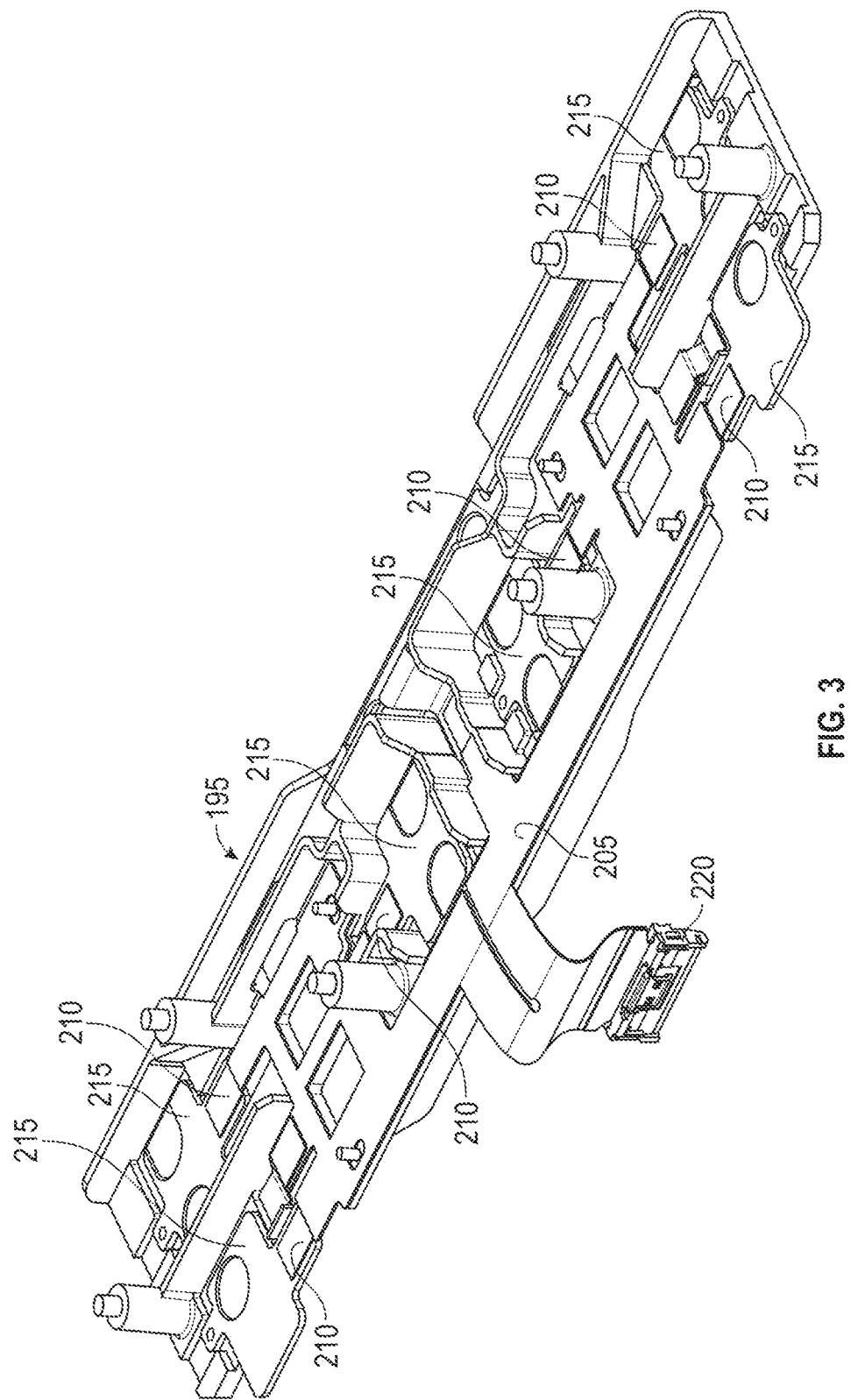
FIG. 3 is an isometric view of an electrical conduction assembly of the battery of FIG. 2.

In FIG. 3, the electrical conduction assembly 195 is shown in greater detail. The electrical conduction assembly 195 may be used, for example, with a battery (such as, but not limited to, the example battery 165 disclosed in FIG. 2). The electrical conduction assembly 190 may comprise a flexible circuit 205 in electrical communication with one or more bus bar interfaces 210. The bus bar interfaces 210 may serve to connect the flexible circuit 205 with one or more bus bars 215 (which may then couple to one or more battery terminals). The flexible circuit 205 may further be coupled to a control module interface 220. The control module interface 220 may connect the electrical conduction assembly 195 with a load source (for example, but not limited to, a vehicle) via the BCM 197. Further discussion regarding the electrical conduction assembly 195 is provided below in connection with FIGS. 10-19.

Figure 4:
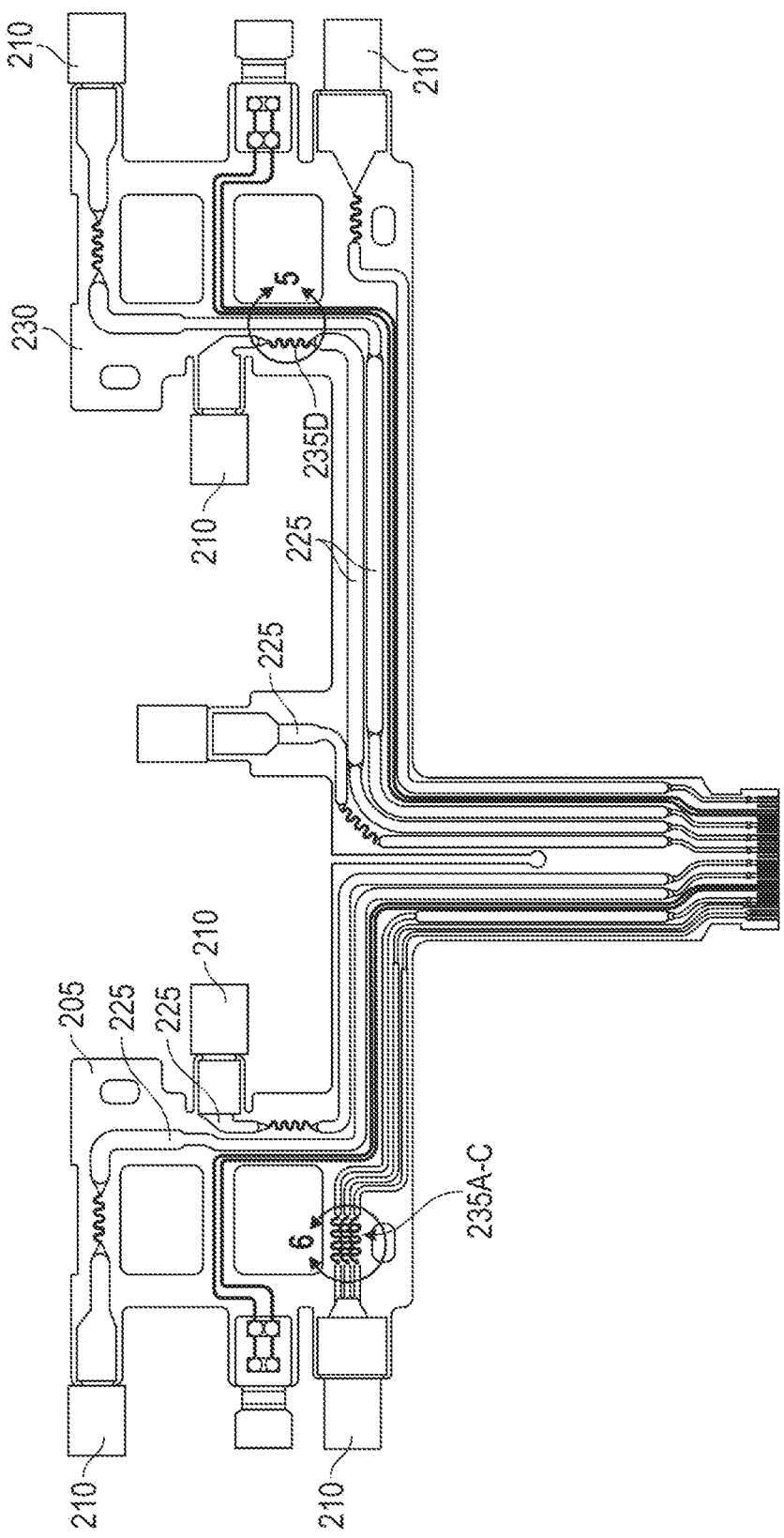
FIG. 4 is a top view of a flexible circuit of the electrical conduction assembly of FIG. 3.
Figure 5:
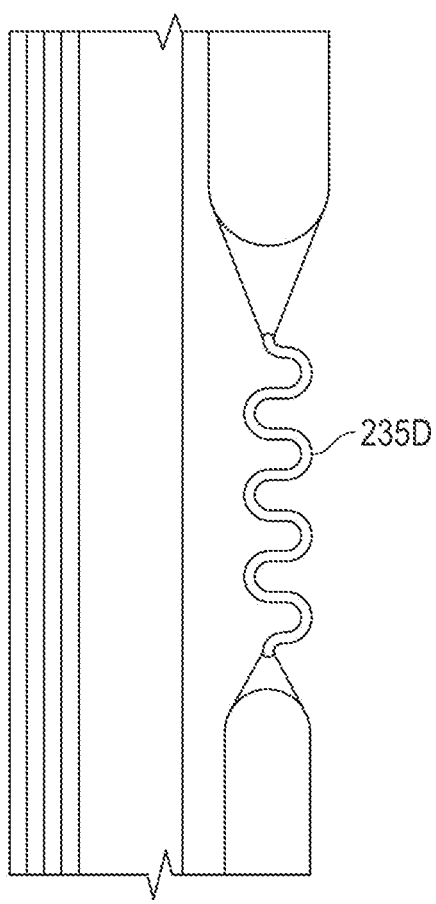
FIG. 5 is a top view of a fuse of the flexible circuit of FIG. 4.
Figure 6:
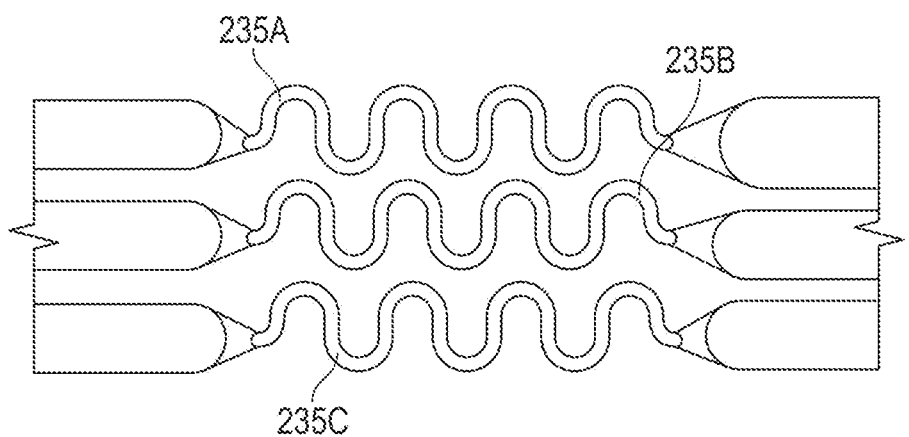
FIG. 6 is a top view of fuses of the flexible circuit of FIG. 4.

A detailed view of the flexible circuit 205 may be seen in FIG. 4, according to various embodiments. A number of bus bar interfaces 210 may be seen coupled to a trace 225. The trace 225 may comprise, in various embodiments, copper. While copper is disclosed, suitable conductive alternatives should be understood as within the scope of this disclosure. The flexible circuit 205 may further comprise a trace cover 230, thereby embedding the trace. The trace cover 230 may comprise, for example, but not limited to, a layer of polyimide. In various embodiments, the trace cover 230 may comprise multiple layers. As one non-limiting example, the trace cover 230 may comprise two layers of polyimide. While polyimide is disclosed, alternative compositions, should be contemplated as within the scope of this disclosure. Other example flexible plastic substrates include PEEK and transparent conductive polyester films. The trace cover 230 comprising multiple layers may provide advantages to encapsulation in the event of flows blowing, as described further herein. In various embodiments, the trace cover 230 may cover the entire or substantially all of the flexible circuit 205.

Further, as shown as part of a non-limiting example in FIG. 4, a number of fuses 235 (only four are labelled) can be seen spaced away from the bus bar interfaces 210. One or more fuses 235 may be provided on each trace in spaced relation to the bus bar interface 210. As a non-limiting example, the one or more fuses may be positioned approximately one-half inch to four inches from a bus bar interface 210 on the trace. While one half inch to four inches are provided, more or less distance should be contemplated as within the scope of this disclosure. The number of fuses in the circuit may vary based on the trace. As a non-limiting example, the number of fuses may be the same or more than the number of bus bars provided, in various examples of embodiments. For example, in FIG. 4, nine fuses are shown in the trace.

The fuses 235 and fuse locations may allow for a number of advantages. For example, the fuses 235 may allow for protection from catastrophic failure, for example, by isolating a cell (e.g., cell 240; FIG. 2). Therefore, the fuse 235D may advantageously be located close to a cell terminal (e.g., cell terminal 245; FIG. 2) but also isolated from heat. This may advantageously prevent the main trace 225 from fusing before the fuse 235D. The location may have further advantages, including if failure occurs, knowledge of where the failure has taken place. Further the location between fuses 235 and the trace 225 may prevent fusing of neighboring traces. In various constructions, fuse location may prevent exposure to debris or smoke from a tripped fuse. In other words, the fuse location may advantageously prevent a secondary fault or cascading failure.

Additionally, the disclosed battery 165 and flexible circuit 205 may advantageously allow for fuse time consistency. For example, by having a disclosed shape and location, fusing current may be consistent. For example, if a certain amperage flows through a fuse, it may consistently fuse in a certain time.

The disclosed flexible circuit 205 may comprise embedded fuses 235. In addition to the disclosed advantages, embedding the fuses 235 into the circuit 205 may allow for advantages in manufacturing. For example, the flexible circuit 205 may not require additional steps for battery assembly. Alternatively, the fuses 235 could be provided on the BCM or through a surface mount process in final assembly manufacture.

The disclosed flexible circuit 205 may provide particular advantages in the automotive environment. For example, the disclosed flexible circuit 205 having fuses (for example, embedded fuses 235) may be used in a twelve-volt, lithium-ion application exposed to the automotive environment. While such a battery is described as a non-limiting example; it should be understood the disclosed flexible circuit 205 may be used in a variety of other batteries. Therefore, the disclosed battery 165 and flexible circuit 205 may advantageously be robust enough to withstand the requirements of the automotive environment.

FIGS. 5-8 show a plurality of fuses. In various embodiments, the fuses may be copper. While copper is disclosed, alternative conductive materials should be understood as within the scope of this disclosure.

Figure 7:
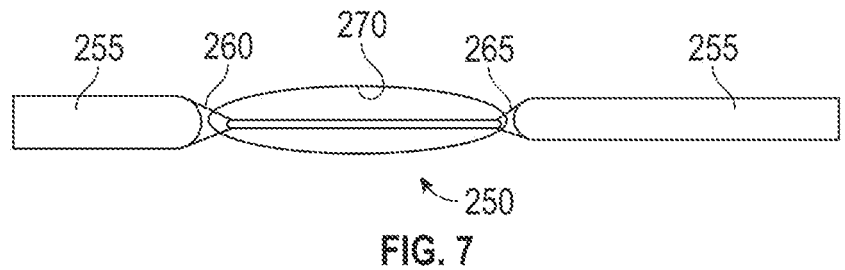
FIG. 7 is a top view of a fuse capable of being used with the flexible circuit of FIG. 4.

FIG. 7 shows a fuse 250, according to various embodiments. The fuse 250 may be seen to have a straight shape and is connected to a trace 255 on each end 260, 265. The fuse may further comprise a cover 270 (or coating). The cover 270 may allow for encapsulation should the fuse 250 blow.

Figure 8:
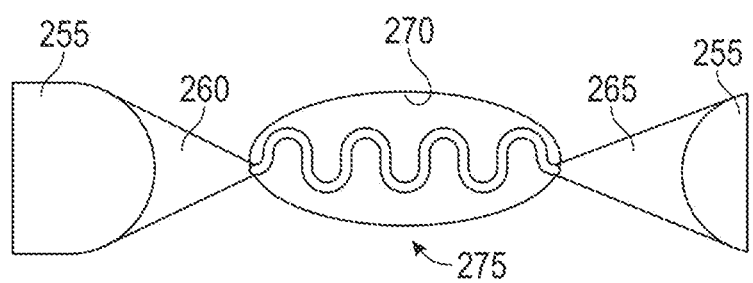
FIG. 8 is a top view of a fuse capable of being used with the flexible circuit of FIG. 4.

FIG. 8 shows another fuse 275, according to various embodiments. The fuse 270 may be seen to have a sinusoidal-type shape and be connected to a trace 255 on each end 260, 265. Again, the fuse 275 may further comprise a cover 270 (or coating), which may allow for encapsulation should the fuse blow.

In various embodiments, the cover 270 may be flat and unnoticeable until the fuse is tripped. The cover 270 may be the same or similar to the coating 230 provided over the flexible circuit 205 as described above.

The fuse 275 having a substantially sinusoidal shape may be understood to have an amplitude which may increase the coverage area. In various embodiments, the fuse 275 and coating 270 (for example, multiple layers of polyimide as described above) may allow for additional volume for any smoke or residue upon fusing of the fuse 275 over a straight fuse 250. Therefore, a sinusoidal fuse 275 may allow for more volume of encapsulation due to the height and width of the fuse.

The use of a sinusoidal fuse 275 may likewise allow for advantages to isolation of heat. In various embodiments, the fuse 275 may allow for concentration of heat in the middle of the fuse, isolating the heat from neighboring traces. Isolation of the fuse may therefore allow for a single isolated short.

Figure 9:
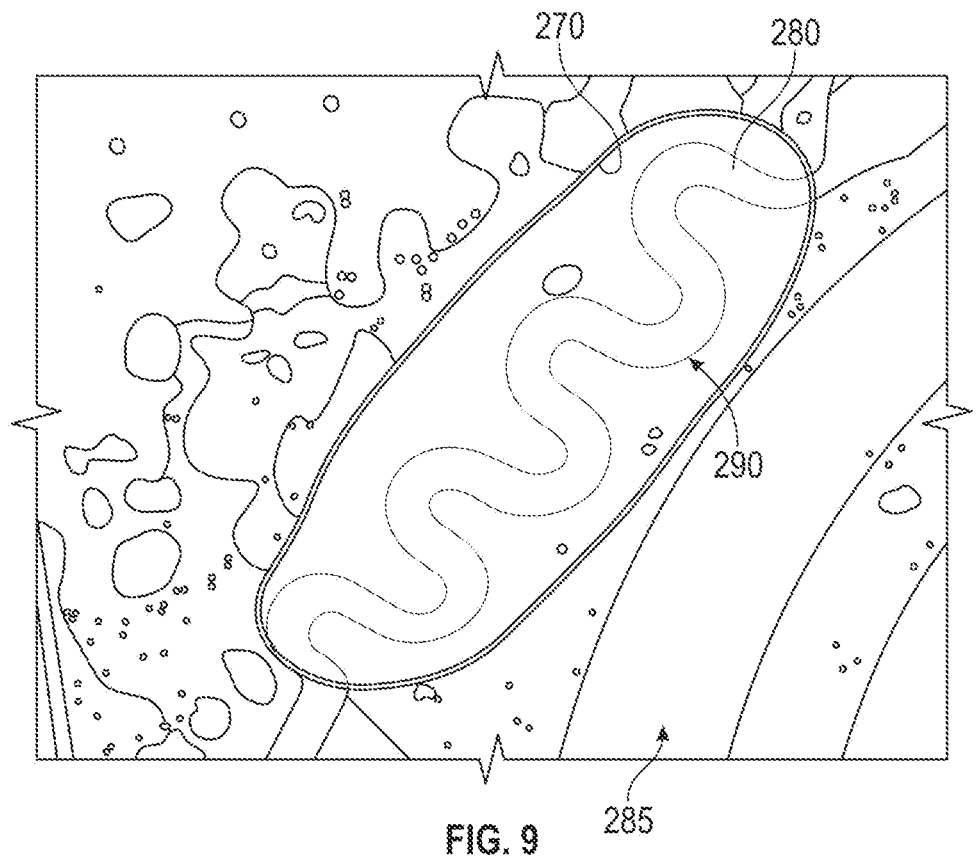
FIG. 9 is a top view of the fuse of FIG. 8 in an environment and being blown.

FIG. 9 shows a fuse 280 having a sinusoidal shape in its environment 285. The fuse 280 is shown as a blown fuse. In various embodiments, the bubble 290 around the fuse 285 is caused by the heat and the encapsulation of the smoke.

The disclosed flexible circuit 205 including the discussed fuses, coating, and trace, has a number of advantages. For example, as seen in FIG. 9 when tripped, the fuse 280 can create the bubble 290. This bubble 290 may be understood to be comprised of material and smoke created from the heat from tripping. The bubble 290 may be comprised of the coating, leading to safe encapsulation of the fuse event. While straight and sinusoidal fuses are disclosed, a variety of other fuse shapes and sizes (e.g., non-straight, curving, angular, irregular) should be understood as within the scope of this disclosure.

Figure 10:
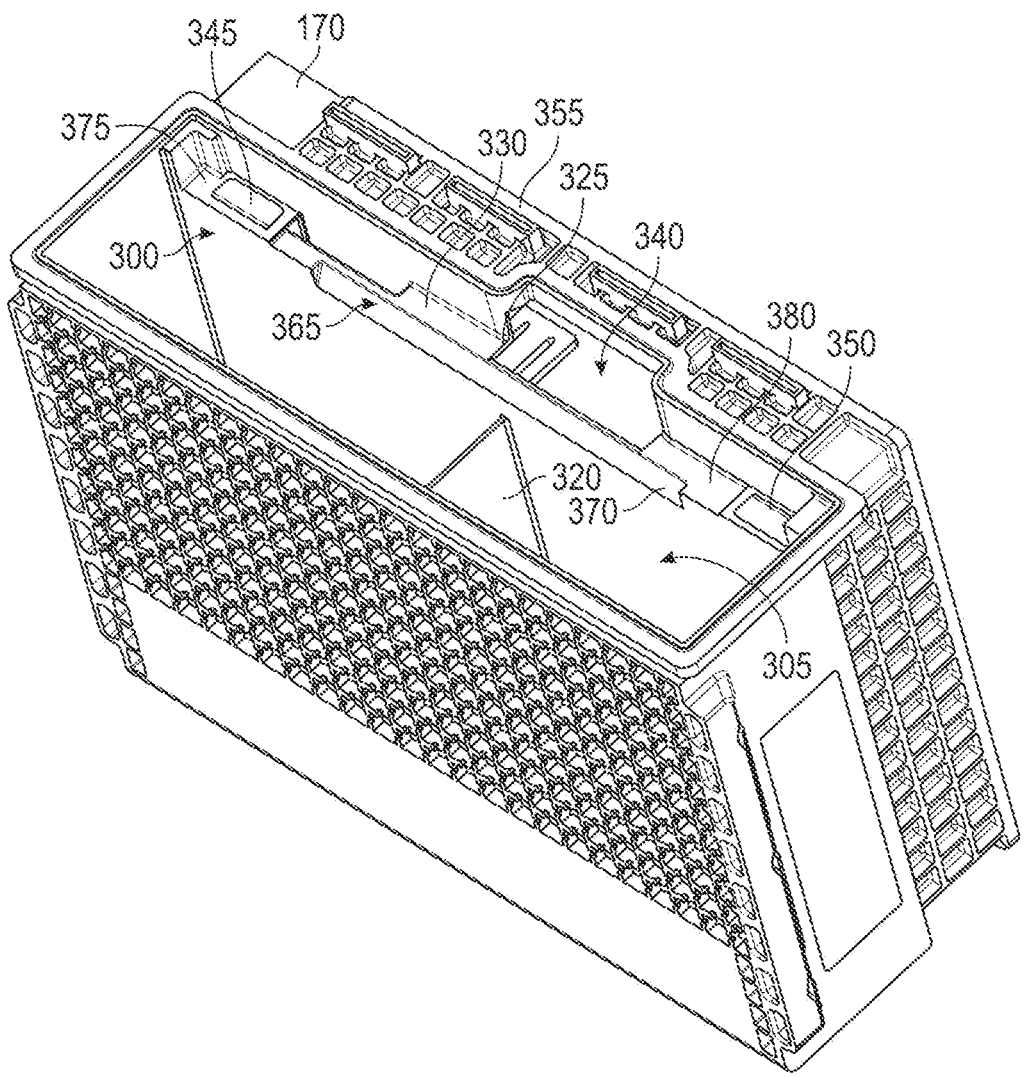
FIG. 10 is an isometric view of a housing of the battery of FIG. 2.
Figure 11:
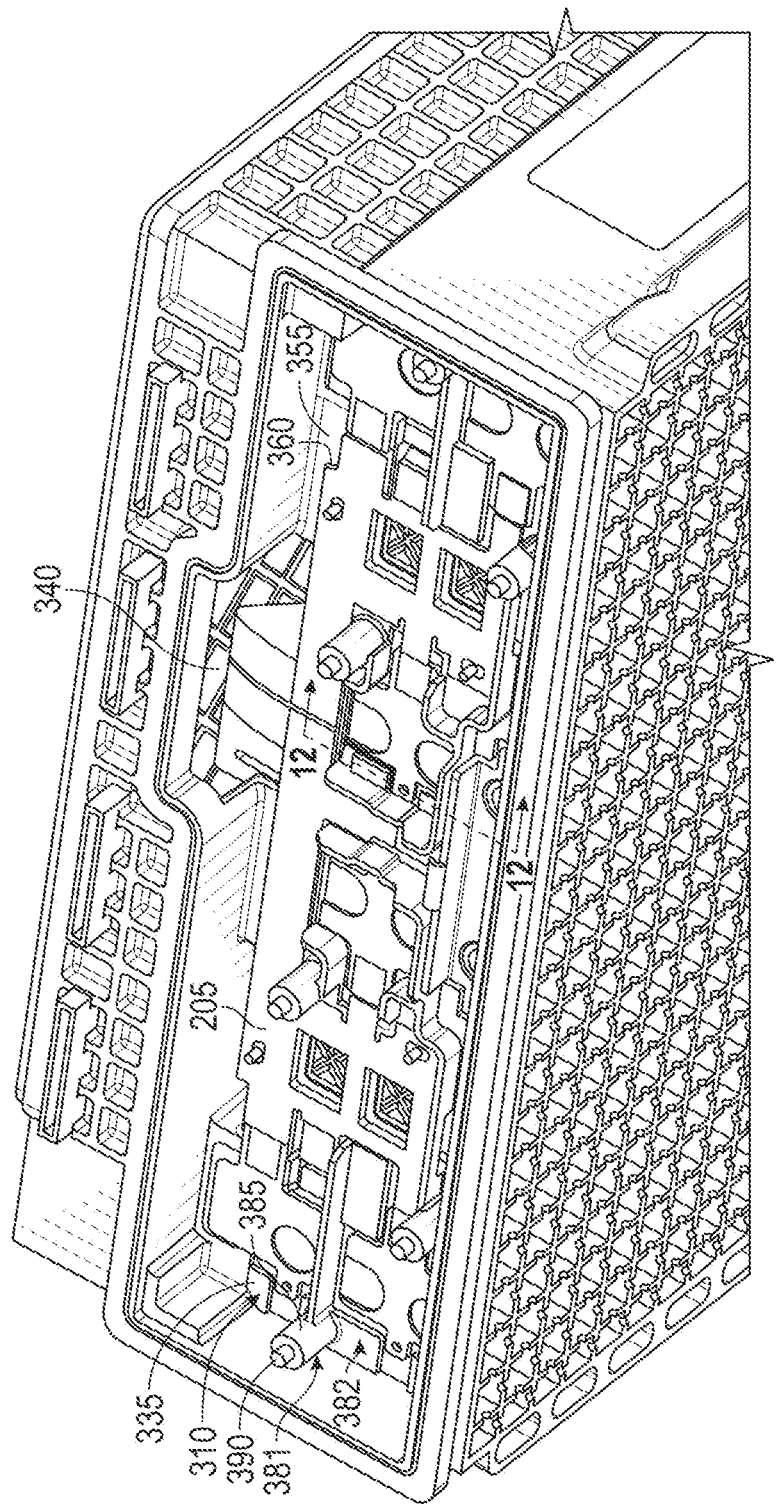
FIG. 11 is a partial isometric, exposed view of the electrical conduction assembly of FIG. 3 in the battery of FIG. 2.

Moving now to FIGS. 10-19, the figures disclose further drawings related to an improved bus bar holder (may also be referred to in the art as a bus bar carrier). FIG. 10 shows the housing 170 of the battery 165. The shown housing 170 has four compartments: first cell compartment 300, second cell compartment 305, electrical conduction assembly compartment 310 (also seen in FIG. 11), and BCM compartment 315 (best shown in FIG. 2). FIG. 11 shows the electrical conduction assembly 195 disposed in the electrical conduction assembly compartment 310. While four compartments are shown and described herein, the number of compartments and arrangement of compartments can be different from what is shown and described herein.

With reference to FIGS. 10 and 11, a partition (or partition wall) 320 separates the first cell compartment 300 and the second cell compartment 305, a first wall 325 separates the cell compartments 300 and 305 and the BCM compartment 315, and a second wall 330 separates the electrical conduction assembly compartment 310 and the BCM compartment 315. As best shown in FIG. 11, a bus bar holder 335 separates the electrical conduction assembly compartment 310 from the cell compartments 300 and 305. The bus bar holder 335 can be an injection molded part and can be formed of polypropylene. The second wall 330 may include one or more apertures between the electrical conduction assembly compartment 310 and the BCM compartment 315. In the shown construction of FIG. 11, the aperture 340 allows a portion of the flexible circuit 205, including the control module interface 220 (FIG. 3), to go from the electrical conduction assembly compartment 310 to the BCM compartment 315. The second wall 330 also includes a second aperture 345 and a third aperture 350, which allow for cell stack to system bus.

Figure 12:
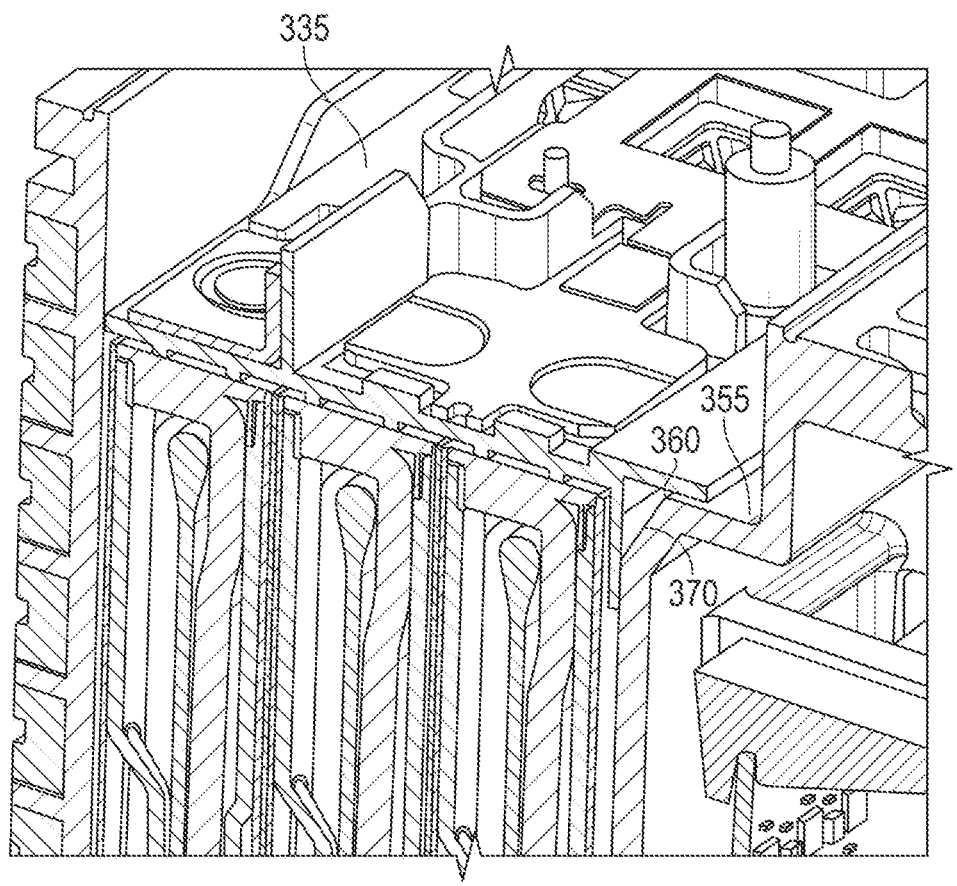
FIG. 12 is a section view of a portion of the battery along line 12-12 of FIG. 11.

With reference to FIGS. 10-12, the second wall 330 includes a shelf 355 to receive a jutting segment (or simply jut) 360 of the bus bar holder 335. The second wall 330 (and similarly the first wall 325) includes an indentation (or chamfer) 365 having a surface 370 angled between the shelf 355 and the cell compartments 300 and 305. The indentation 365 receives a lead-in structure (discuss below) of the bus bar holder 335. The second wall 330 also includes a first platform 375 having the second aperture 345 and a second platform 380 having the third aperture 350. The platforms 375 and 380 are raised to receive respective bus bars (discussed below) of the electrical conduction assembly 310.

Figure 13:
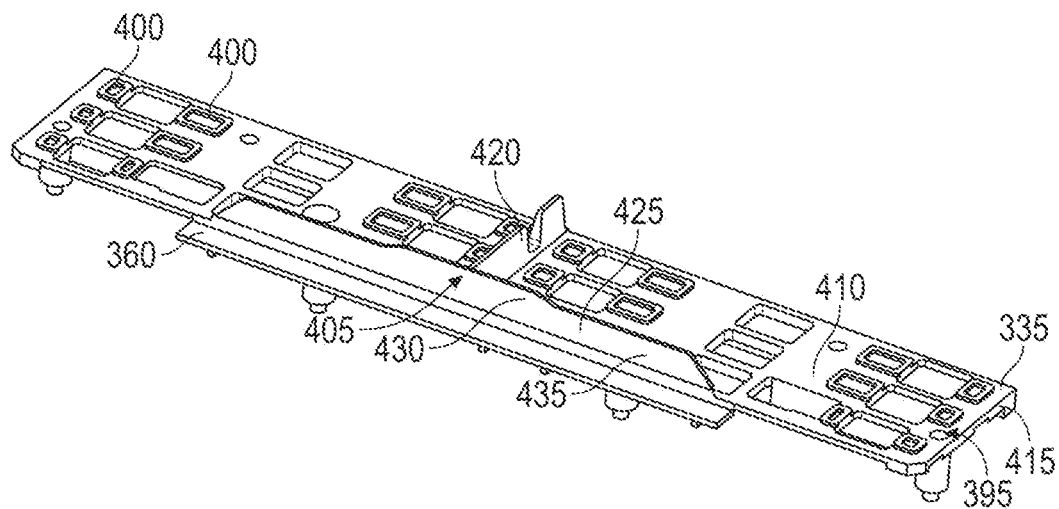
FIG. 13 is a first isometric view of the bottom side of a bus bar holder of the electrical conduction assembly of FIG. 11.

The bus bar holder 335 includes posts (one post 381 is labeled in detail) projecting out from a surface (referred to herein as the top surface 382) of the bus bar holder 335. Each post 381 includes a base (or stem) 385 having a plug 390. When the bus bar holder 335 is placed in the electrical conduction assembly compartment 310, the post 375 can make contact with the cover 175 (FIG. 2) helping to hold the electrical conduction assembly 310 in place. Prior to assembly, the plug 390 can mate with a socket 395 (FIG. 13). The socket is a cavity in the post 381, which allows the bus bar holders 335 and electrical conduction assemblies 195 to be stackable prior to insertion in the battery module 165.

Figure 14:
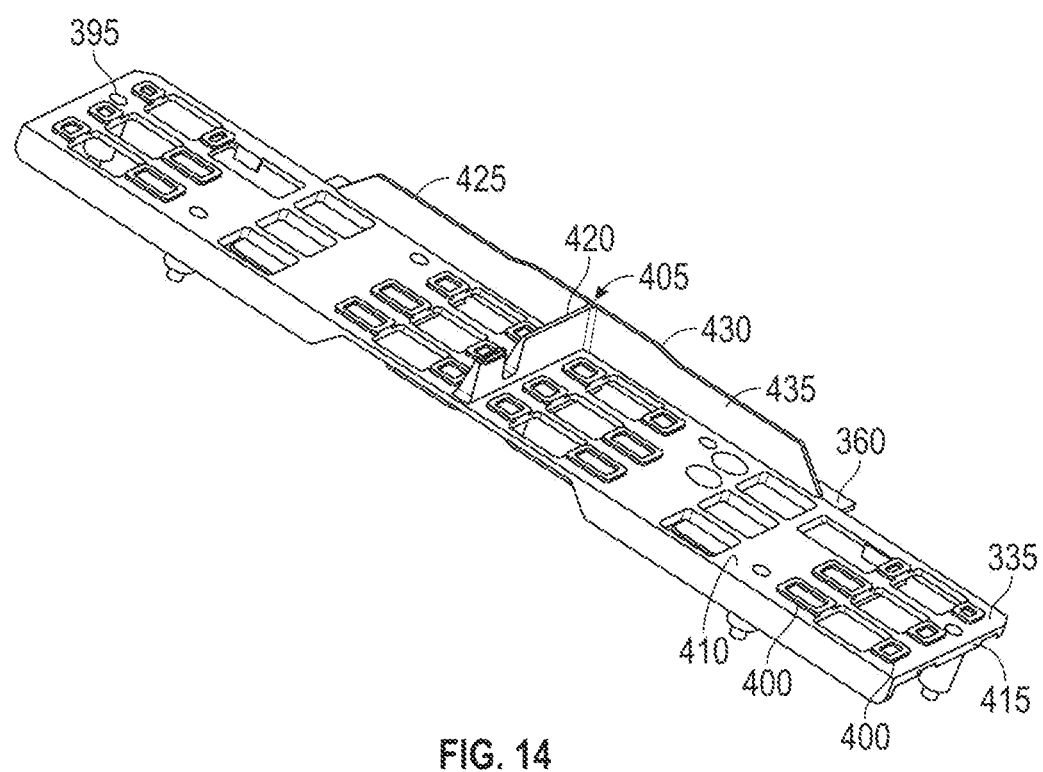
FIG. 14 is a second isometric view of the bottom side of the bus bar holder of FIG. 13.
Figure 15:
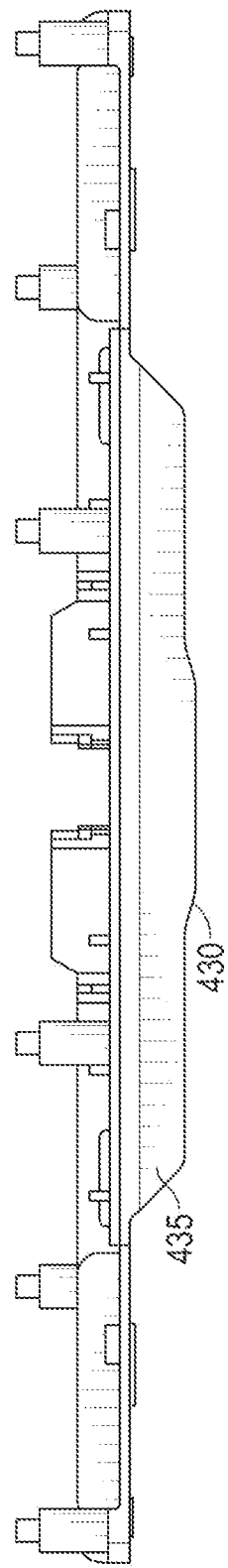
FIG. 15 is a side view of the bus bar holder of FIG. 13.
Figure 16:
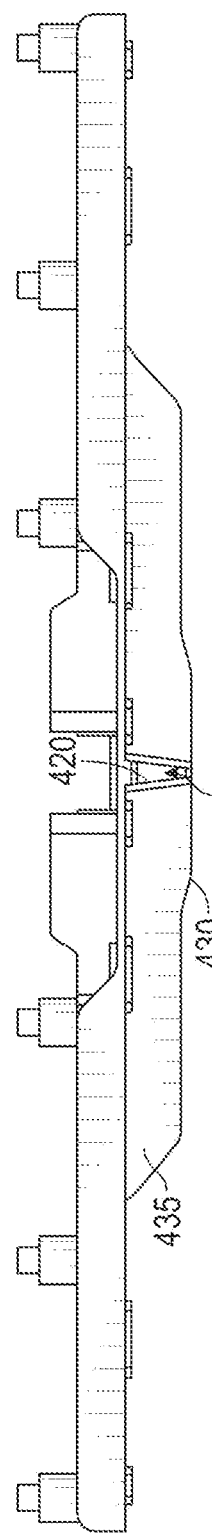
FIG. 16 is a second side view of the bus bar holder of FIG. 13.

FIGS. 13 and 14 are isometric views showing the bottom side of the bus bar holder 335 from two different angles. FIGS. 15 and 16 are side views of the bus bar holder 335. With reference to FIGS. 13-16, the bus bar holder 335 includes a plurality of spacers (two spacers 400 are labelled). The spacers 400 can be of varying sizes and at varying locations. For the shown construction, the spacers 400 are located on opposite sides of the apertures (discussed below) for the cell terminals.

The bus bar holder 335 further includes a lead-in structure 405 extending from the bottom surface 410 of the bus bar holder main body 415. The shown lead-in structure 405 includes two walls 420 and 425 extending from the bottom surface 410. The first wall 420 is orthogonal to the second wall 425. The first wall 420 is wedge shaped and acts as a divider between the battery cells in the first cell compartment 300 and the battery cells in the second cell compartment 335. The wedge shape of the first wall 420 allows the bus bar holder to more easily enter and divide the battery cell stacks among the two compartments.

The second wall 425 includes a two-tiered wall. The first tier 430 of the second wall 425 is sized to be smaller than the length of the angled surface 370. The first tier 430 creates separation between the chamfer 360 and the cell stack and pushes the cells 185 toward the housing bottom. The second tier 435 of the second wall 425 is sized to be larger than the length of the angled surface 370. The second tier 435 provides a broader surface to push the cells 185 back after the first tier 435 has created separation to the housing 170. During manufacturing of the battery module 165, the forces are typically only applied as the bus bar holder 335 is inserted into the housing 170 and only if the battery cells 185 are not naturally in their desired final position. That is, the lead-in structure 405 can provide a fixing force for the battery cells 185 during manufacturing. The lead-in structure 405 can also provide a placement with the battery cells 185 that can help reduce the gap between the cell stacks and can help reduce the potential movement of the battery cells 185 during vibration and shock to the battery module 165.

When the bus bar holder 335 is placed with respect to the battery cells 185, the jutting segment 360 sits on the shelf 355, and the spacers 400 abut the battery cells 185 on either side of the cell terminals 245. The cell terminal 245 enters corresponding apertures and make contact with the bus bars 215. Also, vent apertures align with vents of the battery cells 185 to allow gas to vent from the cells 185 through the electrical conduction assembly 195.

Figure 17:
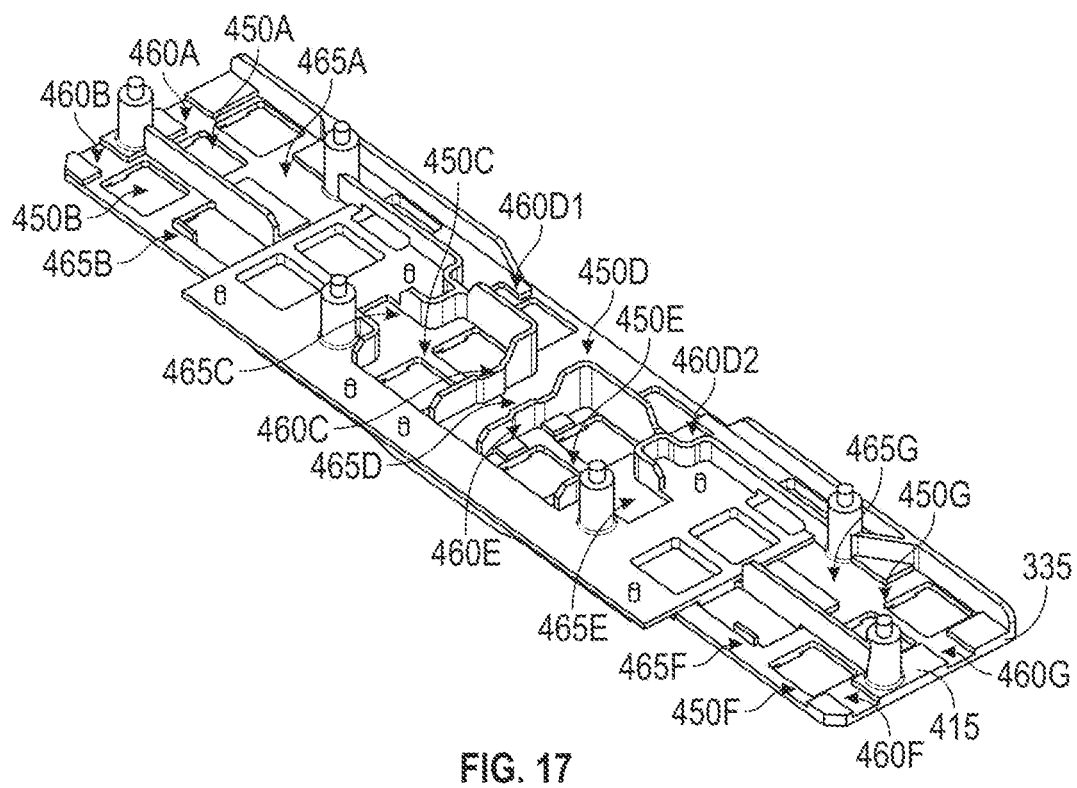
FIG. 17 is a first isometric view of the top side of a bus bar holder of FIG. 13.
Figure 18:
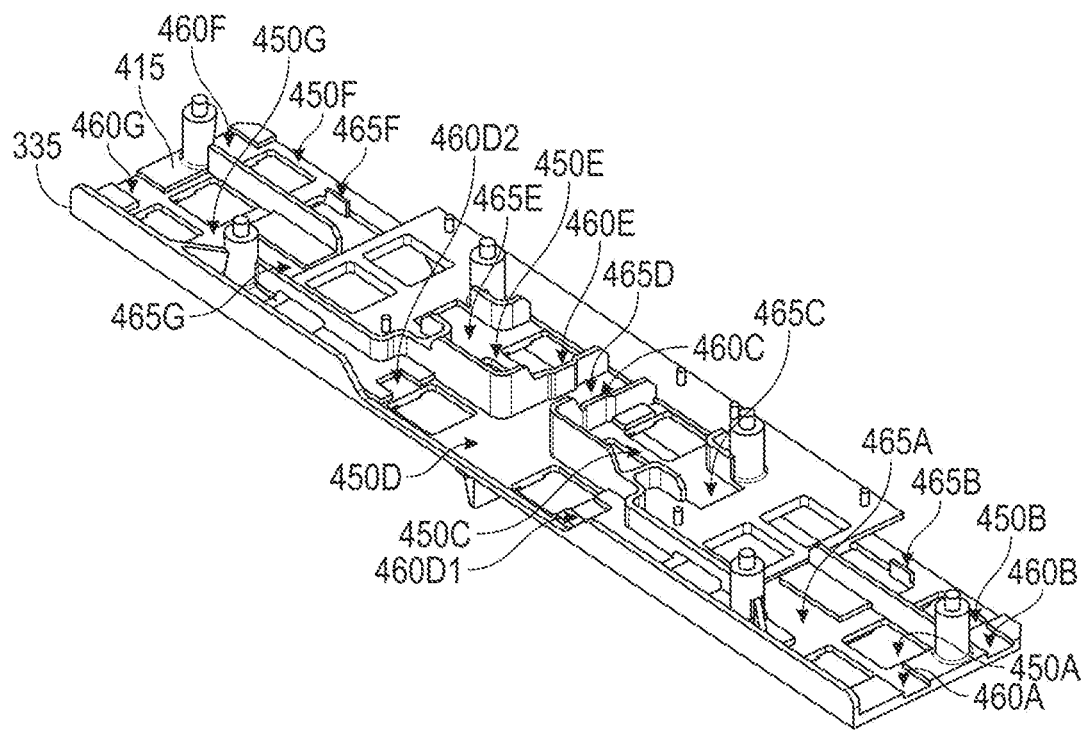
FIG. 18 is a second isometric view of the top side of the bus bar holder of FIG. 13.

FIGS. 17 and 18 are isometric views showing the top surface 382 of the bus bar holder 335 from two different angles. For the construction shown in FIGS. 15-18, the bus bar holder includes a plurality of pockets 450A-G in the main body 415. The plurality of pockets 450A-G hold a plurality of bus bars 215A-G (FIG. 19), respectively. In the shown construction, the plurality of pockets 450A-G includes seven pockets for seven bus bars.

Each pocket of the plurality of pockets 450A-G includes at least one respective recess 460A-G and 465A-G. For pockets 450 A and G, these pockets have two recesses 460A and G and 465A and G. For pockets 450B and F, these pockets have a recess 460B and F and a wall defining a portion of a second recess 465B and F. For pockets 450C and F, the pockets includes a wall forming the recess 460C and F and two walls forming in part the recesses 465C and F. For pocket 450D, the pocket includes two recesses 460D1 and 460D2 and two walls forming a portion of the recess 465D.

The recess 460A-G and 465A-G receive tabs of the bus bar 215A-G. A tab can be a placement tab (e.g., placement tabs 470A-G) or an interface tab (interface tabs 475A-G). The placement tabs 470A-G, in combination with recesses 460A-G, help properly align each bus bar 455A-G in its respective pocket 450A-G. The interface tabs 475A-G, in combination with bus bar interfaces 210A-G, help couple the respective bus bars 215A-G to the flexible circuit 205. The interface tabs 475A-G, in combination with recesses 465A-G, can also be used to properly align each bus bar 455A-G in its respective pocket 450A-G.

Referring again to FIGS. 17 and 18, the bus bar holder 335 includes one or more vertical walls (wall 480 is labelled) to avoid accident shorts during assembly, normal operation, or under abuse conditions. The top surface 382 further includes heat staking posts (post 485 is labelled). The heat staking posts 485 receive the flexible circuit 205 and are heated to secure the flexible circuit 205 in place. The heat staking posts 485 can also be situated to help align and place the flexible circuit 205.

Figure 19:
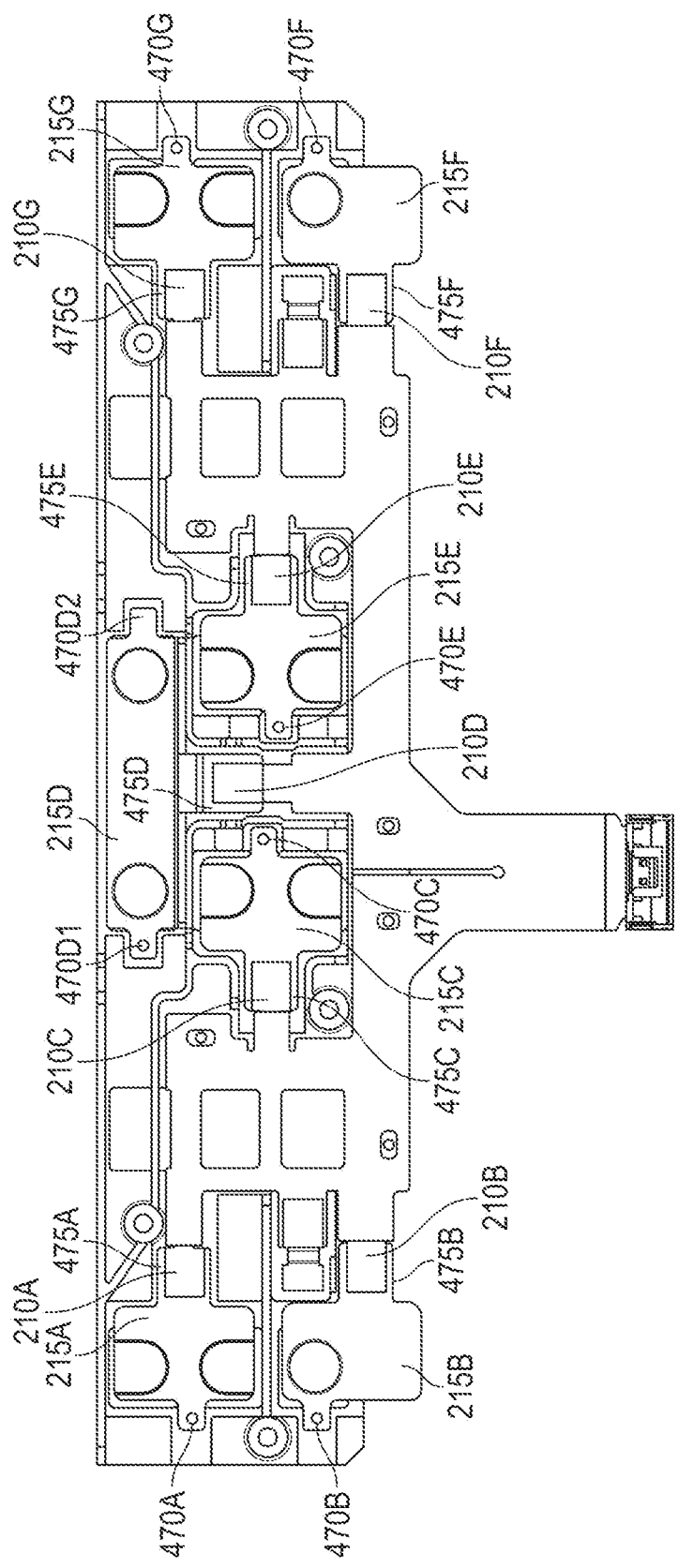
FIG. 19 is a plan view of the electrical conduction assembly of FIG. 11.

The bus bar 215D, which may be referred to as the bridge busbar, includes a fold or multiple bends (best seen in FIGS. 3 and 19). The bridge bus bar 215D includes extra matter or width so that it has sufficient cross-sectional area to prevent the bar 215D from heating up. The additional cross-sectional area helps reduce the effective resistance. However, if the interface tab 475D was flat, then it would be too large to fit in the given space. To help with the extra material in existing space, the interface tab 275D includes folds/bends in the material in order to package. For electrons, they do not see the bends—only see the larger cross section.

The bus bar holder 335 provides the following additional features in addition to the features already discussed above. The following may be in addition or alternative to the above features.

The bus bar holder 335 helps locate and align the cell terminals and cell-to-cell bus bars for welding. For example, the bus bar holder 335 can provide final vertical positioning of the two cell stacks relative to the housing 170. The second wall (or rib) 425 of the bus bar holder 335 wedges between the chamfer in the housing 170 and the cells 185. This wedging biases the cells 175 towards the bottom of the housing 170 to allow insertion of the bus bar holder 335, final positioning of the cells 185, and serves to limit the amount of available space between the cell stacks and the housing opening. This makes the pack less sensitive to vibration and mechanical shock loading. The first wall (or rib) 420 that is perpendicular to the second wall 425 wedges between the two stacks of cells 240, moving them out from the center of the cell compartments.

Therefore, the bus bar holder 335 can help align all cell to cell bus bars 215A-G relative to the twelve cell terminals simultaneously. With one operation placing bus bar holder 335, all seven bus bars 215A-G are placed and located simultaneously, rather than having to precisely place all seven one at a time. The bus bar holder 335 can also maximize the size of the weld area on top of the cell terminals 245 by reducing the amount of positional misalignment the cells 185 have relative to the bus bars 215A-G and the housing. For example, the bus bar holder 335 biases the cells 185 to the bottom of the housing with the first wall 420. This reduces the positional misalignment of the cell terminals 245 relative to the bus bars 215 by more than half, which allows for a larger weld zone. Also, the bus bar holder 335 can provide final horizontal positioning of the two cell stacks relative to the housing 170 with the first wall 430 wedging between the two stacks of cells, moving them out from the center of the pack. This reduces the positional misalignment of the cell terminals 245 relative to the bus bars 215 horizontally, which allows for a larger weld zone. Further, the bus bar holder 335 can provide a limited amount of movement to the bus bars side-to-side and top-to-bottom (with the pack in its normal operating orientation), so that the bus bar holder 335 can be a loose fit inside the housing.

The bus bar holder 335 can also help with contact between bus bars 225 and cell terminals 245. The raised rectangular pads (or spacers 400) contact the top surface of the cells 185 and stop the bus bar holder 335 from going down any further. The spacers set the functional height between the cell terminals 245 and the bus bars 215. If this distance was too large, the bus bar 215 would be pulled at an angle by the flexible circuit 205, and the gap between the terminal 245 and bus bar 215 may result in no weld or a weld of inadequate strength. If this distance is too small, due to variations in the height of components, the bus bar 215 may not come down to be in contact with the cell terminal 245, which may result in no weld or a weld of inadequate strength.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

What is claimed is:

1. A bus bar holder for a battery comprising a housing having a wall, a first plurality of battery cells and a second plurality of battery cells housed by the housing, the bus bar holder comprising:
  a main body comprising:
    a first side to be disposed next to the first plurality of battery cells and the second plurality of battery cells; and
    a second side opposite the first side and to be disposed away from the first plurality of battery cells and the second plurality of battery cells; and
  a lead-in structure coupled with the main body on the first side, the lead-in structure comprising:
    a first lead-in wall to be disposed between the first plurality of battery cells and the second plurality of battery cells;
    a second lead-in wall orthogonal to the first lead-in wall, the second lead-in wall to be disposed between the wall of the housing, and the first plurality of battery cells and the second plurality of battery cells; and
    the first lead-in wall configured to enter in between the first plurality of battery cells and the second plurality of battery cells housed by the housing to divide the first plurality of battery cells and the second plurality of battery cells from each other and the second lead-in wall configured to provide a fixing force coupling the first plurality of battery cells and the second plurality of battery cells with the housing.

2. The bus bar holder according to claim 1, wherein the first lead-in wall and the second lead-in wall are a unitary wall.

3. The bus bar holder according to claim 1, wherein the lead-in structure is integrally formed with the main body.

4. The bus bar holder according to claim 1, wherein the first lead-in wall is wedge-shaped.

5. The bus bar holder according to claim 1, wherein the second lead-in wall is a multi-tiered wall.

6. The bus bar holder according to claim 5, wherein a first tier of the second lead-in wall includes a height from the main body similar to a height from the main body for the first lead-in wall.

7. The bus bar holder according to claim 6, wherein a second tier of the second lead-in wall includes a height from the main body less than the height from the main body for the first lead-in wall.

8. The bus bar holder according to claim 5, wherein a first tier of the multi-tiered wall functions to separate the first plurality of battery cells and the second plurality of battery cells from the wall of the housing and a second tier of the multi-tiered wall functions to urge the first plurality of battery cells and the second plurality of battery cells into a final position within the housing.

9. The bus bar holder according to claim 1, wherein the main body further comprises a first plurality of apertures, each one of which to receive a respective cell terminal from one of the first plurality of battery cells or one of the second plurality of battery cells.

10. The bus bar holder according to claim 1, wherein the main body further comprises a second plurality of apertures, each one of which to align with a respective vent of one of the first plurality of battery cells or one of the second plurality of battery cells.

11. A battery comprising:
  a housing comprising a first wall and a second wall, the second wall partitioning a first cell compartment from a second cell compartment, the first wall and the second wall defining in part the first cell compartment and the second cell compartment;
  a first plurality of battery cells housed by the housing and disposed in the first cell compartment;
  a second plurality of battery cells housed by the housing and disposed in the second cell compartment; and
  the bus bar holder according to claim 1.

12. The battery according to claim 11, wherein the first wall of the housing includes an indentation having an angled surface, wherein the indentation receives at least a portion of the second lead-in wall.

13. The battery according to claim 12, wherein the second wall being orthogonal to the first wall, and wherein the angled surface connects in part the first wall to the second wall.

14. The battery according to claim 13, wherein the bus bar holder further comprises a jutting segment, and wherein the jutting segment abuts a portion of the second wall.

* * * * *